(12) United States Patent
Ramalingam et al.

(10) Patent No.: US 9,393,532 B2
(45) Date of Patent: Jul. 19, 2016

(54) SWEPT MEMBRANE EMULSIFICATION

(71) Applicants: Rohm and Haas Company, Philadelphia, PA (US); Dow Global Technologies LLC, Midland, MI (US)

(72) Inventors: Santhosh K. Ramalingam, Pearland, TX (US); Aaron Sarafinas, Ivyland, PA (US)

(73) Assignees: Dow Global Technologies LLC; Rohm and Haas Company

( * ) Notice: Subject to any disclaimer, the term of this patent is extended or adjusted under 35 U.S.C. 154(b) by 0 days.

(21) Appl. No.: 14/761,327

(22) PCT Filed: Jan. 27, 2014

(86) PCT No.: PCT/US2014/013107
§ 371 (c)(1),
(2) Date: Jul. 16, 2015

(87) PCT Pub. No.: WO2014/133701
PCT Pub. Date: Sep. 4, 2014

(65) Prior Publication Data
US 2015/0352506 A1    Dec. 10, 2015

Related U.S. Application Data

(60) Provisional application No. 61/769,778, filed on Feb. 27, 2013.

(51) Int. Cl.
*B01F 5/06* (2006.01)
*B01F 5/04* (2006.01)
(Continued)

(52) U.S. Cl.
CPC ............ *B01F 5/0665* (2013.01); *B01F 3/0807* (2013.01); *B01F 3/0865* (2013.01); *B01F 5/0465* (2013.01); *B01F 5/0468* (2013.01); *B01F 7/00908* (2013.01); *B29B 9/10* (2013.01)

(58) Field of Classification Search
CPC .... B01F 5/0665; B01F 3/0807; B01F 3/0811; B01F 3/0857; B01F 3/0865; B01F 5/0465; B01F 5/0468; B01F 15/00883; B01F 15/00876; B01F 15/00012
USPC ....................... 366/176.1, 302, 305
See application file for complete search history.

(56) References Cited

U.S. PATENT DOCUMENTS 4,192,921 A    3/1980 Dales
4,246,386 A    1/1981 Howell et al.
(Continued)

FOREIGN PATENT DOCUMENTS

DE    4329077    4/1994
EP    1262225    5/2003
(Continued)

OTHER PUBLICATIONS

Yuyama, et al., Preparation and Analysis of Uniform Emulsion Droplets using SPG Membrane Emulsification Technique, Colloids and Surfaces, A: Physicochemical and Engineering Aspects 168 92000) 159-174.
(Continued)

*Primary Examiner* — Charles Cooley
*Assistant Examiner* — Marc C Howell

(57) ABSTRACT

A method for making an emulsion using a rotating membrane device (10) including:
  i) a membrane assembly (12) including a cylindrical porous surface (14) enclosing an inner chamber (16) concentrically positioned about an axis (X),
  ii) a vane assembly (18) including a plurality of vanes (20) extending along the axial length (L) of the porous surface (14) of the membrane assembly (12), wherein the vanes (24) comprise a shear surface (24) located within 1 mm of the porous surface (14), and
  iii) a vessel (22) enclosing the membrane and vane assemblies (12, 18);
wherein the method includes the step of moving a dispersible liquid phase (26) through the porous surface (14) into a continuous liquid phase (28) while rotating at least one of the vane assembly (18) or membrane assembly (12) relative to the other about the axis (X) such that the shear surfaces (24) exert shear forces upon the dispersible liquid phase (26) passing through the porous surface (14) to form droplets (30) of a dispersed liquid phase having a size of 1 to 500 μm within the continuous liquid phase (28).

4 Claims, 3 Drawing Sheets

(51) Int. Cl.
*B01F 7/00* (2006.01)
*B01F 3/08* (2006.01)
*B29B 9/10* (2006.01)

(56) References Cited

U.S. PATENT DOCUMENTS

| | | | |
|---|---|---|---|
| 4,256,840 A | 3/1981 | Meitzner et al. | |
| 4,283,499 A | 8/1981 | Howell | |
| 4,419,245 A | 12/1983 | Barrett et al. | |
| 4,444,961 A | 4/1984 | Timm | |
| 4,564,644 A | 1/1986 | Harris | |
| 4,623,706 A | 11/1986 | Timm et al. | |
| 4,666,673 A | 5/1987 | Timm | |
| 5,244,926 A | 9/1993 | Harris et al. | |
| 7,622,510 B2 | 11/2009 | Arnaud | |
| 7,632,416 B2 | 12/2009 | Levitt | |
| 7,896,169 B2 | 3/2011 | Levitt et al. | |
| 8,201,697 B2 | 6/2012 | Levitt et al. | |
| 8,231,263 B2 | 7/2012 | Windhab et al. | |
| 8,267,572 B2 | 9/2012 | Windhab et al. | |
| 2011/0038901 A1* | 2/2011 | Windhab | B01F 3/0815 424/401 |
| 2011/0120959 A1 | 5/2011 | Levitt et al. | |
| 2011/0220586 A1 | 9/2011 | Levitt | |
| 2012/0010063 A1 | 1/2012 | Levitt et al. | |
| 2012/0175798 A1 | 7/2012 | Fukuda et al. | |

FOREIGN PATENT DOCUMENTS

| | | | |
|---|---|---|---|
| GB | 2385008 | 10/2005 | |
| GB | 2444035 | 5/2008 | |
| GB | 2467925 | 8/2010 | |
| WO | 0105830 | 6/2001 | |
| WO | 2007144658 | 12/2007 | |
| WO | 2008009623 | 1/2008 | |
| WO | 2010072230 | 7/2010 | |
| WO | 2010072237 | 7/2010 | |
| WO | 2012154448 | 11/2012 | |
| WO | WO 2013093419 A2 * | 6/2013 | .......... C06B 21/0008 |
| WO | 2014099361 | 6/2014 | |

OTHER PUBLICATIONS

Vladisavljevic et al., Recent Developments in Manufacturing Emulsions and Particulate Products Using Membranes, Advances in Colloid and Interface Science 113 (2005), 1-20.

* cited by examiner

SWEPT MEMBRANE EMULSIFICATION

FIELD

The present invention is directed toward membrane emulsification.

INTRODUCTION

Membrane emulsification traces its roots to the work of Nakashima and Shimizu using glass membranes in the 1980's, i.e. so-called "Shirasu Porous Glass" (SPG) membranes. See for example Yuyama, et al., Preparation and Analysis of Uniform Emulsion Droplets using SPG Membrane Emulsification Technique, Colloids and Surfaces, A: Physicochemical and Engineering Aspects 168 92000) 159-174. Since that time, work as expanded to include a wide range of membrane materials and configurations. See for example: i) Vladisavljevic et al., Recent Developments in Manufacturing Emulsions and Particulate Products Using Membranes, Advances in Colloid and Interface Science 113 (2005), 1-20; ii) Joscelyne, et al. Membrane Emulsification—A Literature Review, Journal of Membrane Science 169 (2000) 107-117; and iii) Egidi et al., Membrane Emulsification Using Membranes of Regular Pore Spacing: Droplet size and Uniformity in the Presence of Surface Shear, Journal of Membrane Science, 323 (2008) 414-420.

One membrane emulsification technique involves moving a dispersible liquid phase through an oscillating membrane located within a continuous liquid phase. The oscillating motion creates a continuous shear on the dispersible liquid phase exiting the membrane and generates more uniformly sized dispersed droplets. Examples are described in: GB 2444035, GB 2467925 and US 2012/0175798. U.S. Pat. No. 7,622,510 describes a similar technique wherein the membrane is vibrated by mechanical, electrical or magnetic excitation. Another technique involves rotating a cylindrical membrane to generate a continuous shearing effect on a dispersible liquid phase passing through the membrane and into a surrounding continuous liquid phase. Examples are described in WO 2001/45830, WO 2007/144658, U.S. Pat. No. 8,231,263, U.S. Pat. No. 8,267,572 and EP 1262225. See also Vladisavljevic et al., Manufacture of Large Uniform Droplets Using Rotating Membrane Emulsification, Journal of Colloid and Interface Science 299 (2006) 396-402 and US2009/323459.

SUMMARY

The present invention includes improved means and methods for making emulsions using membranes. In a preferred embodiment, droplets of a dispersed liquid phase are formed as they emerge through a membrane by being subject to a discontinuous or variable shear force. For example, in one embodiment, the invention includes an improved method for making an emulsion using a rotating membrane device including: i) a membrane assembly including a cylindrical porous surface enclosing an inner chamber concentrically positioned about an axis (X), ii) a vane assembly including a plurality of vanes extending along the axial length of the porous surface of the membrane assembly, wherein the vanes comprise a shear surface located within 1 mm of the porous surface, and iii) a vessel enclosing the membrane and vane assemblies. The method includes the step of moving a dispersible liquid phase through the porous surface into a continuous liquid phase while rotating at least one of the vane assembly or membrane assembly relative to the other about the axis (X) such that the shear surfaces exert shear forces upon the dispersible liquid phase passing through the porous surface to form droplets of a dispersed liquid phase having a size of 1 to 500 μm within the continuous liquid phase. Many different embodiments are described.

BRIEF DESCRIPTION OF THE DRAWINGS

The figures are not to scale and include idealized views to facilitate description. Where possible, like numerals have been used throughout the figures and written description to designate the same or similar features.

DETAILED DESCRIPTION

Figure 1:
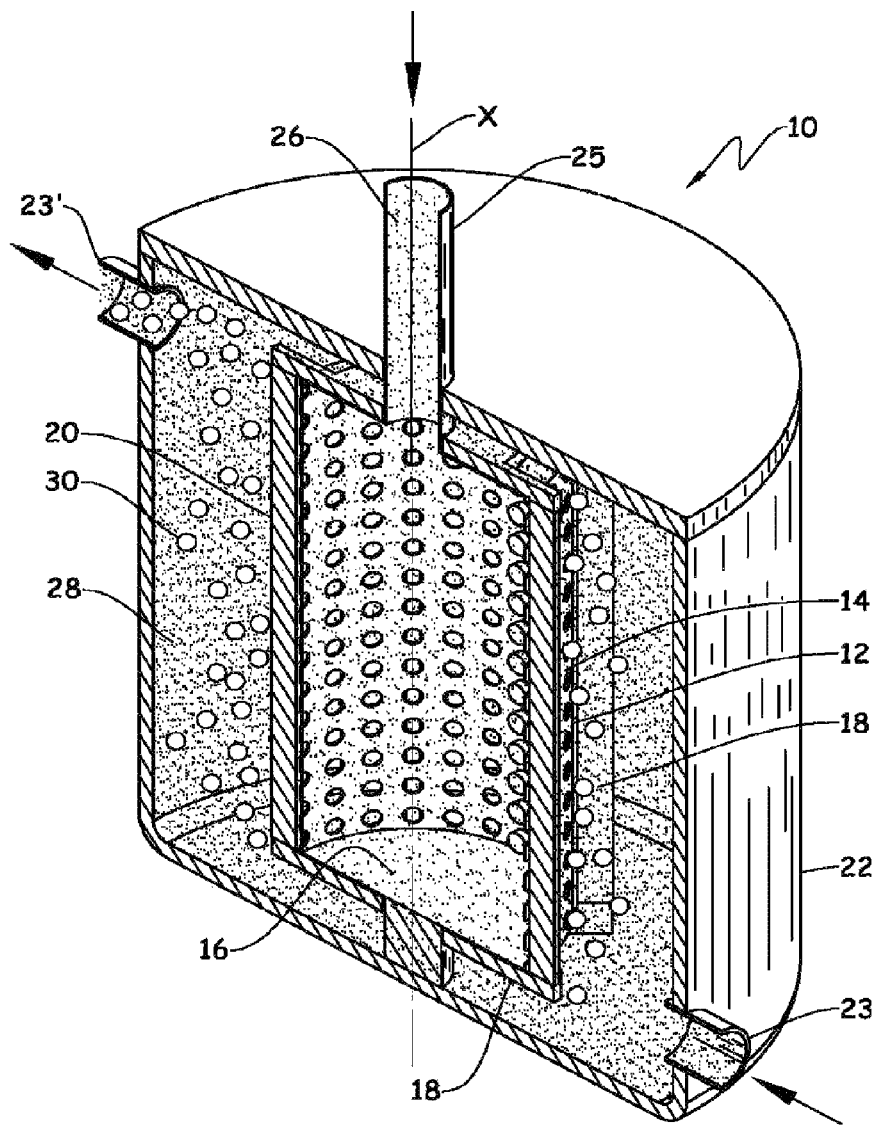
FIG. 1 is a cross-sectional view of rotating membrane device.

The present invention includes a rotating membrane device generally shown at (10) in FIG. 1. The device (10) includes a membrane assembly (12) including a cylindrical porous surface (14) enclosing an inner chamber (16), and a vane assembly (18) including a plurality of vanes (20) extending along the axial length (L) of the porous surface (14) of the membrane assembly (12). Both the membrane assembly (12) and vane assembly (18) are located within a vessel (22). The vessel (22) may include multiple fluid inlets (23) and outlets (23') and may be equipped with heating and stirring features (not shown) as is common with fluid reactors.

Figure 2:
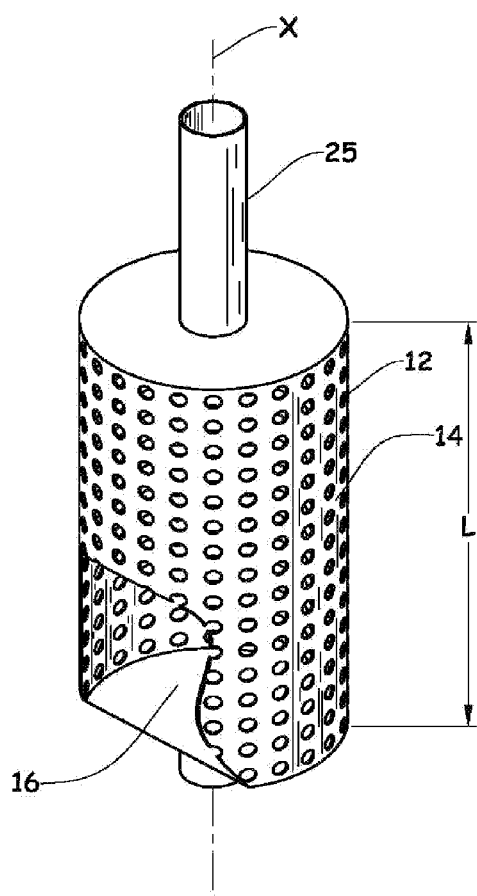
FIG. 2 is a partially cut-away perspective view of a membrane assembly.

As best shown in FIGS. 2 and 4, the membrane assembly (12) is concentrically positioned about an axis (X). The inner chamber (16) of the membrane assembly (12) is preferably in fluid communication with a fluid reservoir, e.g. via fluid port (25). The membrane assembly (12) may be fabricated from a wide variety of porous materials including polymers, ceramics and metals. The pore size (e.g. 1 to 500 micron, but more preferably 1 to 250 μm, 10 to 100 μm, or 15 to 50 μm), shape (e.g. V-shape, elliptical, slotted, etc.) and uniformity may vary depending upon application. Similarly, the thickness of the membrane may also vary (e.g. 0.05 to 10 mm) based upon the material of construction and end use application. Representative examples of such materials are described: U.S. Pat. No. 7,632,416, U.S. Pat. No. 7,896,169, U.S. Pat. No. 8,201,697, US2011/0120959, US 2011/0220586, US2012/0010063, GB 2385008, WO 2007/144658 and WO 2012/154448, the entire subject matter of which is incorporated herein by reference. In one preferred embodiment, the membrane assembly (12) comprises a corrosion-resistant metal (e.g. electroformed nickel screen) including uniform sized pores with sizes from 10 to 250 microns. By way of example, Stork Veco offers commercial products including a metal foil formed by a photolithographic technique and by electro-deposition of nickel onto a substrate. Membranes made from electro-less plating techniques may also be used, see GB 2385008.

Figure 3:
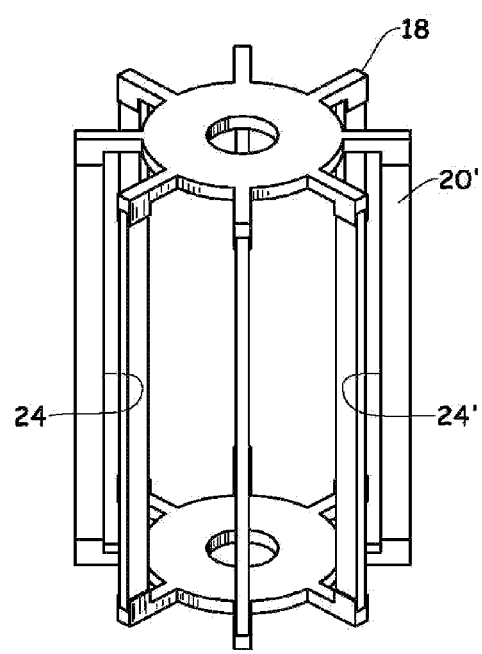
FIG. 3 is a perspective view of a vane assembly.

As best shown in FIGS. 3 and 4, the vane assembly (18) includes plurality of vanes (20, 20') extending along the axial length (L) of the porous surface (14) of the membrane assembly (12). The number of vanes (20) may vary on the Application but preferably comprises from 2 to 20 equally spaced vanes. While shown configured as axially aligned vertical blades, the vanes may extend along a curved or diagonal path along the general length (L) of the porous surface (14). Each vane (20) preferably includes a shear surface (24, 24') located within 1 mm (more preferably within 0.5 or 0.1 mm) of the porous surface (14) without making physical contact therewith. The collective surface area of the shear surfaces (24, 24') is preferably less than one half (more preferably less than 1/3, 1/5, 1/10 and in some embodiments less than 1/25) of the surface area of the cylindrical porous surface (14) of the membrane assembly (12).

Figures 4A, 4B:
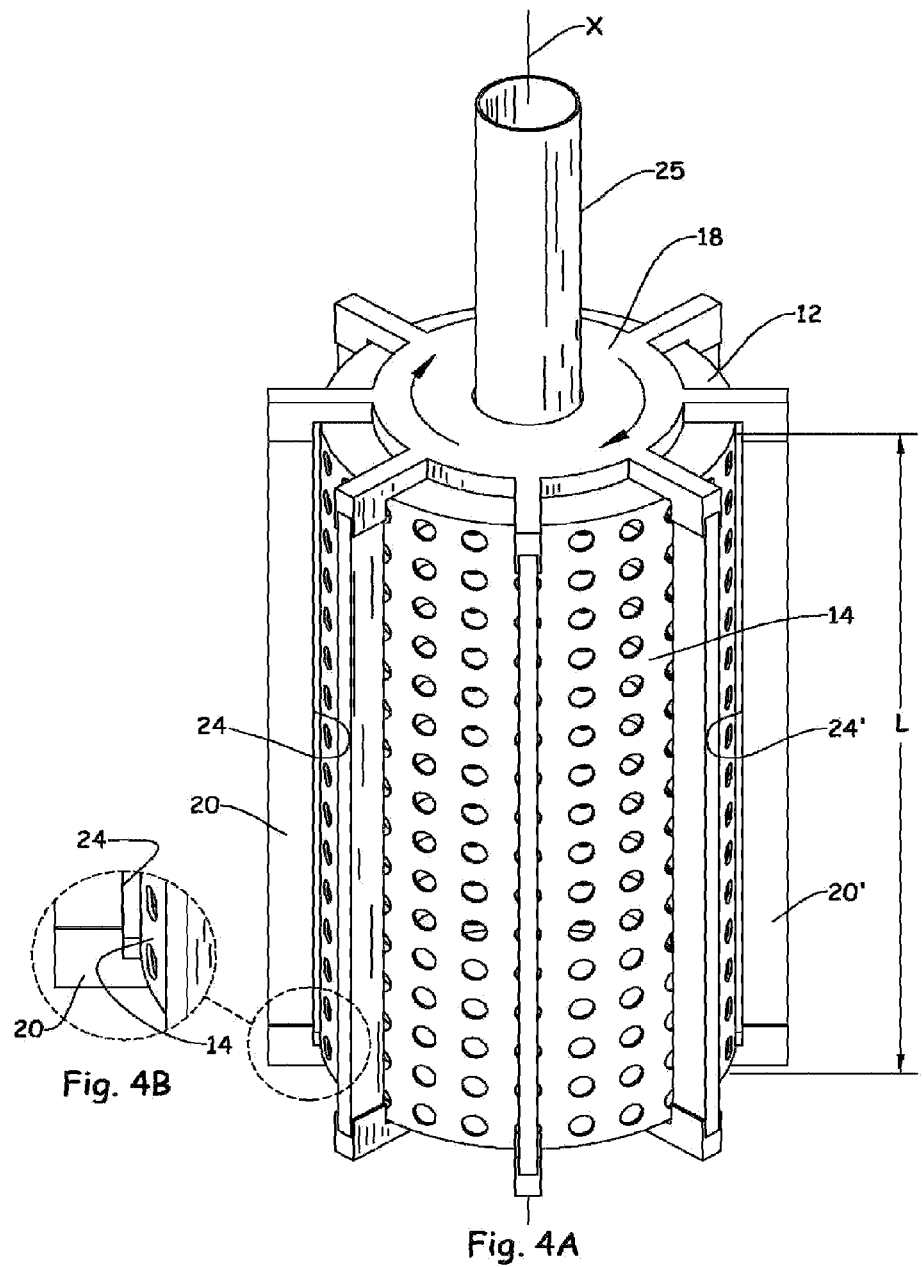
FIG. 4A is a perspective view of the membrane and vane assemblies of FIGS. 2 and 3 shown as assembled.
FIG. 4B is an enlarged sectional view taken from FIG. 4A.

FIG. 4A illustrates a preferred embodiment with the vane assembly (18) installed concentrically about the membrane assembly (12) such that the shear surfaces (24) of the vanes (20) come into close proximity to the porous surface (14) located about the outer circumference of the membrane assembly (12). The curved arrow represents one embodiment wherein the vane assembly (18) rotates about the axis (X) and the membrane assembly (12). FIG. 4B shows the gap located between the shear surface (24) and the porous surface (14).

In the preferred embodiment illustrated in FIG. 1, the subject method includes the step of moving a dispersible liquid phase (26) through the porous surface (14) of the membrane assembly (12) into a continuous liquid phase (28) while rotating at least one of the vane assembly (18) or membrane assembly (12) relative to the other about the axis (X) such that the shear surfaces (24, 24') exert shear forces upon the dispersible liquid phase (26) passing through the porous surface to form droplets (30) of a dispersed liquid phase. The droplets (30) or "microspheres" preferably have a size of 1 to 500 µm, 1 to 250 µm, 10 to 100 µm or 15 to 50 µm within the continuous liquid phase (28). Once formed the droplets (30) may be further treated, e.g. polymerized by heating the resulting emulsion, or removed from the vessel (22) e.g. by moving the droplets to a holding tank. In one embodiment, the step of moving the dispersible liquid phase (26) through the porous surface (14) includes the step of applying pressure to a source of the dispersible liquid phase (26) located within the inner chamber (16) of the membrane assembly (12) to force the dispersible liquid phase (26) radially outward through pores of the porous surface (14) and into a surrounding continuous liquid phase (28). In the embodiments shown in FIGS. 1 and 4, the vane assembly (18) is positioned concentrically about the membrane assembly (12) and the step of rotating involves spinning the vanes (24, 24') of the vane assembly (18) about the outer circumference of the cylindrical porous surface (14) of the membrane assembly (12). While preferably fixed, the membrane assembly (12) may rotate about the axis (X) relative to a fixed vane assembly (18), or both assemblies (12, 18) may move relative to one another.

Unlike prior art rotating membrane emulsification techniques that exert a continuous shear force on the dispersible phase passing through the membrane, the present invention utilizes a discontinuous and preferably cyclic shear force which is believed to produce more uniform and controllable droplets. That is, droplet formation can be precisely controlled by optimizing the relative speed of rotation of the vanes (20) to the porous surface (14) along with the spacing between the porous surface (14) and the shear surfaces (24). As the shear surfaces (24) of the vanes (20) move relative to the porous surface (14), a spike in shear forces dislodges the droplet from the porous surface (14). The rotation speed and spacing can be optimized to generate desired droplet sizes. While the relative rotation between the porous surface (14) and shear surfaces (24) may serve to draw the dispersible liquid phase (26) through the membrane, the dispersible liquid phase (26) may also be subject to an independent positive pressure to force dispersible liquid (26) through the porous surface (14) and into the continuous liquid phase (28).

In alternative embodiments not shown, the vane assembly (18) may be concentrically positioned within the inner chamber (16) such that the shear surfaces (24, 24') of the vanes (20) come into close proximity to the porous surface located about the outer circumference of the inner chamber (16). And whether the vane assembly (18) is positioned within or about the membrane assembly (12), and whether the vane assembly (18) rotates relative to the membrane assembly (12), or visa-versa, the dispersible liquid phase may forced to flow from the inner chamber (16) radially outward through the porous surface (14) and into the vessel (22) or in the opposite direction with the continuous liquid phase residing within the inner chamber (16).

The selection liquid phases is not particularly limited and more than two phases may be utilized, and each phase may include multiple components, e.g. include polymerizable monomers, surfactants, emulsion stabilizers, catalyst, inhibitors, etc. Organic (oil) and aqueous phases are most common but other immiscible phases may also be used. Vladisavljevic et al., Recent Developments in Manufacturing Emulsions and Particulate Products Using Membranes, provides a description of representative phases.

In one embodiment, the invention may be used to prepare crosslinked copolymer particles useful in the production of ion exchange and chelating resins. The particles may be prepared by forming an emulsion or suspension of a dispersible first monomer mixture in a continuous suspending medium as described by F. Helfferich in Ion Exchange, (McGraw-Hill 1962) at pp. 35-36. The dispersible first monomer mixture comprises: 1) a first monovinylidene monomer, 2) a first crosslinking monomer, and 3) an effective amount of a first free-radical initiator. The suspending medium may contain one or more suspending agents commonly employed in the art. Polymerization is initiated by heating the suspension to a temperature of generally from about 50-90° C. The suspension is maintained at such temperature or optionally increased temperatures of about 90-150° C. until reaching a desired degree of conversion of monomer to copolymer. Other suitable polymerization methods are described in U.S. Pat. No. 4,444,961; U.S. Pat. No. 4,623,706; U.S. Pat. No. 4,666,673; and U.S. Pat. No. 5,244,926—each of which is incorporated herein in its entirety.

A representative list of monovinylidene monomers are described in Polymer Processes, edited by Calvin E. Schildknecht, published in 1956 by Interscience Publishers, Inc., New York, Chapter III, "Polymerization in Suspension" at pp. 69-109; see Table II (pp. 78-81). Of the monomers listed, water-insoluble monovinylidene monomers including the monovinylidene aromatics such as styrene and substituted styrene are preferred. The term "substituted styrene" includes substituents of either/or both the vinylidene group and phenyl group of styrene and include: vinyl naphthalene, alpha alkyl substituted styrene (e.g., alpha methyl styrene) alkylene-substituted styrenes (particularly monoalkyl-substituted styrenes such as vinyltoluene and ethylvinylbenzene) and halo-substituted styrenes, such as bromo or chlorostyrene and vinylbenzylchloride. Other applicable monomers include monovinylidene non-styrenics such as: esters of α,β-ethylenically unsaturated carboxylic acids, particularly acrylic or methacrylic acid, methyl methacrylate, isobornylmethacrylate, ethylacrylate, and butadiene, ethylene, propylene, acrylonitrile, and vinyl chloride; and mixtures of one or more of said monomers. Preferred monovinylidene monomers include styrene and substituted styrene such as ethylvinylbenzene. The term "monovinylidene monomer" is intended to include homogeneous monomer mixtures and mixtures of different types of monomers, e.g. styrene and isobornylmethacrylate.

The seed polymer component preferably comprises a styrenic content greater than 50 molar percent, and more preferably greater than 75, and in some embodiments greater than 95 molar percent (based upon the total molar content). The term "styrenic content" refers to the quantity of monovinylidene monomer units of styrene and/or substituted styrene utilized to form the copolymer. "Substituted styrene" includes substituents of either/or both the vinylidene group and phenyl group of styrene as described above. In preferred embodiments, the first monomer mixture used to form the first polymer component (e.g. seed) comprises at least 75 molar percent, preferably at least 85 molar percent and in some embodiments at least 95 molar percent of styrene.

Examples of suitable crosslinking monomers (i.e., polyvinylidene compounds) include polyvinylidene aromatics such as divinylbenzene, divinyltoluene, divinylxylene, divinylnaphthalene, trivinylbenzene, divinyldiphenylsulfone, as well as diverse alkylene diacrylates and alkylene dimethacrylates. Preferred crosslinking monomers are divinylbenzene, trivinylbenzene, and ethylene glycol dimethacrylate. The terms "crosslinking agent," "crosslinker" and "crosslinking monomer" are used herein as synonyms and are intended to include both a single species of crosslinking agent along with combinations of different types of crosslinking agents. The proportion of crosslinking monomer in the copolymer seed particles is preferably sufficient to render the particles insoluble in subsequent polymerization steps (and also on conversion to an ion-exchange resin), yet still allow for adequate imbibition of an optional phase-separating diluent and monomers of the second monomer mixture. In some embodiments, no crosslinking monomer will be used. Generally, a suitable amount of crosslinking monomer in the seed particles is minor, i.e., desirably from about 0.01 to about 5 molar percent, preferably from about 0.1 to about 2.5 molar percent based on total moles of monomers in the first monomer mixture used to prepare the seed particles. In a preferred embodiment, the first polymer component (e.g. seed) is derived from polymerization of a first monomer mixture comprising at least 85 molar percent of styrene (or substituted styrene such as ethylvinylbenzene) and from 0.01 to about 5 molar percent of divinylbenzene.

Polymerization of the first monomer mixture may be conducted to a point short of substantially complete conversion of the monomers to copolymer or alternatively, to substantially complete conversion. If incomplete conversion is desired, the resulting partially polymerized seed particles advantageously contain a free-radical source therein capable of initiating further polymerization in subsequent polymerization stages. The term "free-radical source" refers to the presence of free-radicals, a residual amount of free-radical initiator or both, which is capable of inducing further polymerization of ethylenically unsaturated monomers. In such an embodiment of the invention, it is preferable that from about 20 to about 95 weight percent of the first monomer mixture, based on weight of the monomers therein, be converted to copolymer and more preferably from about 50 to about 90 weight percent. Due to the presence of the free radical source, the use of a free-radical initiator in a subsequent polymerization stage would be optional. For embodiments where conversion of the first monomer mixture is substantially complete, it may be necessary to use a free-radical initiator in subsequent polymerization stages.

The free-radical initiator may be any one or a combination of conventional initiators for generating free radicals in the polymerization of ethylenically unsaturated monomers. Representative initiators are UV radiation and chemical initiators, such as azo-compounds including azobisisobutyronitrile; and peroxygen compounds such as benzoyl peroxide, t-butylperoctoate, t-butylperbenzoate and isopropylpercarbonate. Other suitable initiators are mentioned in U.S. Pat. No. 4,192,921; U.S. Pat. No. 4,246,386; and U.S. Pat. No. 4,283,499—each of which is incorporated in its entirety. The free-radical initiators are employed in amounts sufficient to induce polymerization of the monomers in a particular monomer mixture. The amount will vary as those skilled in the art can appreciate and will depend generally on the type of initiators employed, as well as the type and proportion of monomers being polymerized. Generally, an amount of from about 0.02 to about 2 weight percent is adequate, based on total weight of the monomer mixture.

Various suspending agents are conventionally employed to assist with maintaining a relatively uniform suspension of monomer droplets within the suspending medium. Illustrative suspending agents are gelatin, polyvinyl alcohol, magnesium hydroxide, hydroxyethylcellulose, methylhydroxyethylcellulose methylcellulose, and carboxymethyl methylcellulose. Other suitable suspending agents are disclosed in U.S. Pat. No. 4,419,245. The amount of suspending agent used can vary widely depending on the monomers and suspending agents employed. Latex inhibitors such as sodium dichromate may be used to minimize latex formation.

The seed particles may be of any convenient size. In general, the seed particles desirably have a volume average particle diameter of from about 75 to about 1000 microns, preferably from about 150 to about 800 microns, and more preferably from about 200 to about 600 microns. The distribution of the particle diameters may be Gaussian or uniform (e.g. at least 90 volume percent of the particles have a particle diameter from about 0.9 to about 1.1 times the volume average particle diameter).

The copolymer particles may also be prepared by providing a plurality of the seed particles and thereafter, adding a second monomer mixture such that the mixture is imbibed by the seed particles and polymerization is conducted therein. This step is preferably conducted as a batch-seeded process or as an in situ batch-seeded process, as described below. The second monomer mixture may also be added intermittently or continuously under polymerizing conditions, such as described in U.S. Pat. No. 4,564,644. In the so-called "batch-seeded" process, seed particles comprising from about 10 to about 50 weight percent of the copolymer are preferably suspended within a continuous suspending medium. A second dispersible monomer mixture containing a free radical initiator is then added to the suspended seed particles, imbibed thereby, and then polymerized. Although less preferred, the seed particles can be imbibed with the second monomer mixture prior to being suspended in the continuous suspending medium. The second monomer mixture may be added in one amount or in stages. The second monomer mixture is preferably imbibed by the seed particles under conditions such that substantially no polymerization occurs until the mixture is substantially fully imbibed by the seed particles. The time required to substantially imbibe the monomers will vary depending on the copolymer seed composition and the monomers imbibed therein. However, the extent of imbibition can generally be determined by microscopic examination of the seed particles, or suspending media, seed particles and monomer droplets. The second monomer mixture desirably contains from about 0.5 to about 25 molar percent, preferably from about 2 to about 17 molar percent and more preferably 2.5 to about 8.5 molar percent of crosslinking monomer based on total weight of monomers in the second monomer mixture with the balance comprising a monovinylidene monomer; wherein the selection of crosslinking monomer and monovinylidene monomer are the same as those described above with reference to the preparation of the first monomer mixture, (i.e. seed preparation). As with the seed preparation, the preferred monovinylidene monomer includes styrene and/or a substituted styrene. In a preferred embodiment, the second polymer component (i.e. second monomer mixture, or "imbibed" polymer component) has a styrenic content greater than 50 molar percent, and more preferably at least 75 molar percent (based upon the total molar content of the second monomer mixture). In a preferred embodiment, the second polymer component is derived from polymerization of a second monomer mixture comprising at least 75 molar percent of styrene (and/or substituted styrene such as ethylvinylbenzene) and from about 1 to 20 molar percent divinylbenzene.

In an in-situ batch-seeded process, seed particles comprising from about 10 to about 80 weight percent of the IPN copolymer product are initially formed by suspension polymerization of the first monomer mixture. The seed particles can have a free-radical source therein as previously described, which is capable of initiating further polymerization. Optionally, a polymerization initiator can be added with the second monomer mixture where the seed particles do not contain an adequate free radical source or where additional initiator is desired. In this embodiment, seed preparation and subsequent polymerization stages are conducted in-situ within a single reactor. A second monomer mixture is then added to the suspended seed particles, imbibed thereby, and polymerized. The second monomer mixture may be added under polymerizing conditions, but alternatively may be added to the suspending medium under conditions such that substantially no polymerization occurs until the mixture is substantially fully imbibed by the seed particles. The composition of the second monomer mixture preferably corresponds to the description previously given for the batch-seeded embodiment.

The copolymer particles preferably have a bead structure with a median particle diameter from 200 to 800 microns. The crosslinked copolymer particles may have a Gaussian particle size distribution but preferably have a relatively uniform particle size distribution, i.e. "monodisperse" that is, at least 90 volume percent of the beads have a particle diameter from about 0.9 to about 1.1 times the volume average particle diameter.

The crosslinked copolymer may be macroporous or gel-type. The terms "gel-type" and "macroporous" are well-known in the art and generally describe the nature of the copolymer particle porosity. The term "macroporous" as commonly used in the art means that the copolymer has both macropores and mesopores. The terms "microporous," "gellular," "gel" and "gel-type" are synonyms that describe copolymer particles having pore sizes less than about 20 Angstroms Å, while macroporous copolymer particles have both mesopores of from about 20 Å to about 500 Å and macropores of greater than about 500 Å. Gel-type and macroporous copolymer particles, as well as their preparation are further described in U.S. Pat. No. 4,256,840 and U.S. Pat. No. 5,244,926—the entire contents of which are incorporated herein by reference.

Many embodiments of the invention have been described and in some instances certain embodiments, selections, ranges, constituents, or other features have been characterized as being "preferred." Characterizations of "preferred" features should in no way be interpreted as deeming such features as being required, essential or critical to the invention. Stated ranges include end points. The entire subject matter of each of the aforementioned patent documents is incorporated herein by reference.

The invention claimed is:

1. A method for making an emulsion wherein the method comprises providing:
   i) a membrane assembly (12) comprising a cylindrical porous surface (14) enclosing an inner chamber (16) concentrically positioned about an axis (X),
   ii) a vane assembly (18) comprising a plurality of vanes (20) extending along the axial length of the porous surface (14) of the membrane assembly (12), wherein the vanes (20) comprise a shear surface (24) located within 1 mm of, and without making physical contact with the porous surface, and
   iii) a vessel (22) enclosing the membrane and vane assemblies;
   and wherein the method further comprises the step of moving a dispersible liquid phase through the porous surface (14) into a continuous liquid phase while rotating at least one of the vane assembly (18) or membrane assembly (12) relative to the other about the axis (X) such that the shear surfaces (24, 24') exert shear forces upon the dispersible liquid phase passing through the porous surface (14) to form droplets of a dispersed liquid phase having a size of 1 to 500 µm within the continuous liquid phase.

2. The method of claim 1 wherein the step of forcing the dispersible liquid phase through the porous surface (14) includes the step of applying pressure to a source of the dispersible liquid phase located within the inner chamber (16) of the membrane assembly (12) to force the dispersible liquid phase radially outward through pores of the porous surface (14) and into a surrounding continuous liquid phase.

3. The method of claim 1 wherein the vane assembly is positioned concentrically about the membrane assembly (12) and the step of rotating involves spinning the vanes (20) of the vane assembly (18) about the circumference of the cylindrical porous surface (14) of the membrane assembly (12).

4. The method of claim 1 wherein the porous surface (14) and shear surfaces (24) both have surface areas, and wherein the collective surface area of the shear surfaces (24) is less than one half of the surface area of the porous surface (14).

* * * * *